United States Patent [19]
Zollinger

[11] Patent Number: 5,121,694
[45] Date of Patent: Jun. 16, 1992

[54] PIPE CRAWLER WITH EXTENDABLE LEGS

[76] Inventor: William T. Zollinger, 3927 Almon Dr., Martinez, Ga. 30907

[21] Appl. No.: 679,497

[22] Filed: Apr. 2, 1991

[51] Int. Cl.$^5$ .................................................. B61B 13/10
[52] U.S. Cl. .................................. 104/138.2; 104/138.1; 105/365
[58] Field of Search .......................... 104/138.1, 138.2; 105/365

[56] References Cited

U.S. PATENT DOCUMENTS

| | | | |
|---|---|---|---|
| 4,112,850 | 9/1978 | Sigel-Gfeller | 104/138 |
| 4,177,734 | 12/1979 | Rhoden | 104/138 |
| 4,244,296 | 1/1981 | Vertut | 104/138 |
| 4,432,271 | 2/1984 | Wentzell et al. | 91/527 |
| 4,457,236 | 7/1984 | Akhmadiev et al. | 104/138 |
| 4,458,601 | 7/1984 | Braithwaite et al. | 104/138.2 |
| 4,576,097 | 3/1986 | Foster | 104/138.2 |
| 4,581,938 | 4/1986 | Wentzell | 73/634 |
| 4,654,702 | 3/1987 | Tolino et al. | 358/100 |
| 4,690,006 | 9/1987 | Urata | 73/866.5 |
| 4,770,105 | 9/1988 | Takagi et al. | 104/138.2 |
| 4,919,223 | 4/1990 | Egger et al. | 180/8.1 |
| 5,018,451 | 5/1991 | Hapstack | 104/138.2 |

Primary Examiner—Robert J. Oberleitner
Assistant Examiner—Kevin D. Rutherford
Attorney, Agent, or Firm—Harold M. Dixon; William R. Moser; Richard E. Constant

[57] ABSTRACT

A pipe crawler for moving through a pipe in inchworm fashion having front and rear leg assemblies separated by air cylinders to increase and decrease the spacing between assemblies. Each leg of the four legs of an assembly is moved between a wall-engaging, extended position and a retracted position by a separate air cylinder. The air cylinders of the leg assemblies are preferably arranged in pairs of oppositely directed cylinders with no pair lying in the same axial plane as another pair. Therefore, the cylinders can be as long a leg assembly is wide and the crawler can crawl through sections of pipes where the diameter is twice that of other sections. The crawler carries a valving system, a manifold to distribute air supplied by a single umbilical air hose to the various air cylinders in a sequence controlled electrically by a controller. The crawler also utilizes a rolling mechanism, casters in this case, to reduce friction between the crawler and pipe wall thereby further extending the range of the pipe crawler.

19 Claims, 5 Drawing Sheets

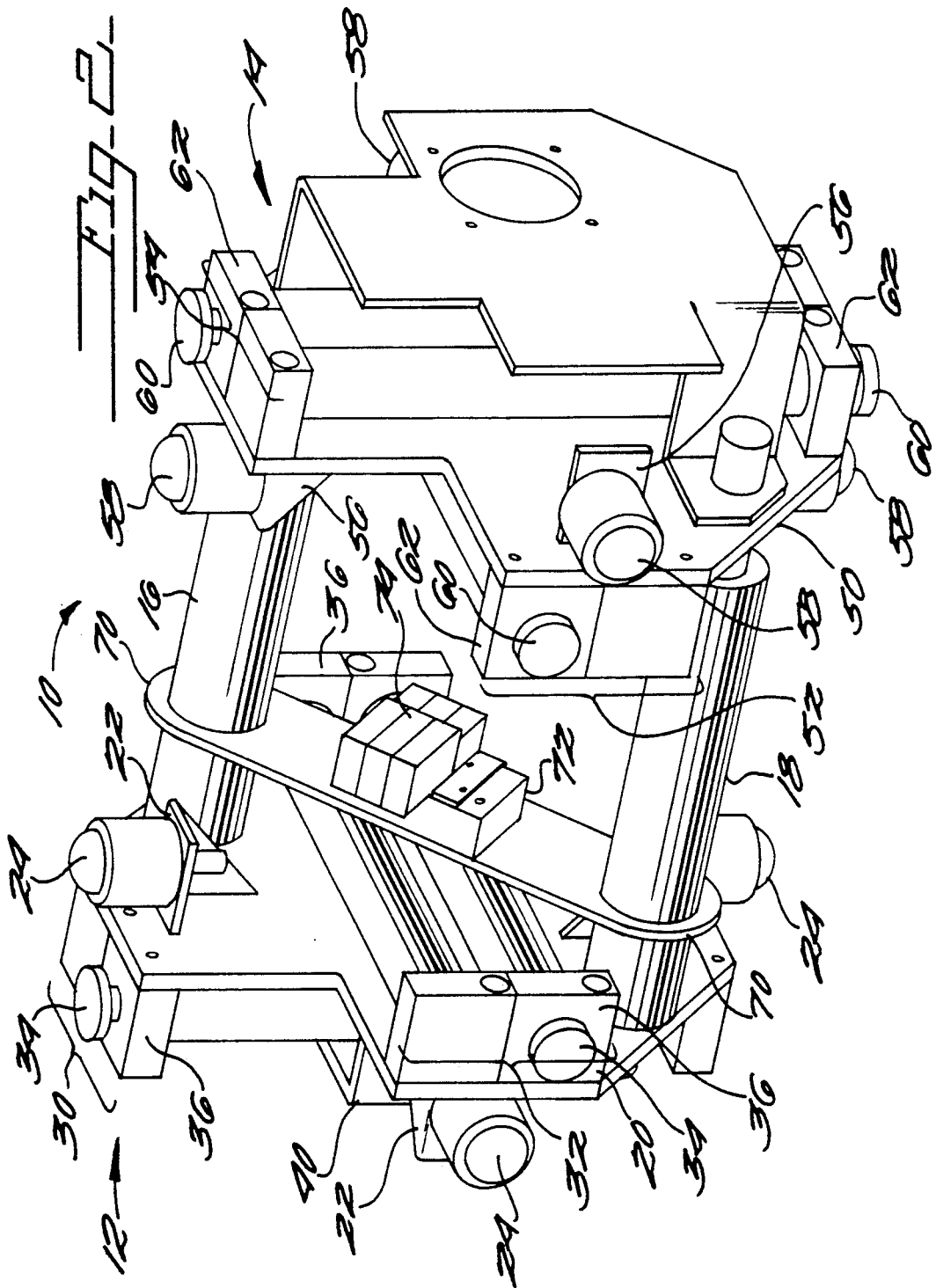

5,121,694

PIPE CRAWLER WITH EXTENDABLE LEGS

The U.S. Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to pipe crawlers, and, more particularly, to pipe crawlers with legs that extend to enable them to crawl in larger diameter pipes.

2. Discussion of Background

There are a number of devices that are designed to move through piping for various purposes such as inspection of welds. These include a few crawlers that move with an "inchworm" type of motion. These pipe crawlers have generally a front set and a rear set of legs separated by body pistons or body air cylinders. Both front and rear sets of legs are made up of air cylinders that extend radially to the wall of the piping. The front set of legs will hold the crawler while the rear set is pulled to the first by a retraction of the body air cylinders; then the rear set will hold the crawler as the front set moves forward when the body air cylinders extend. As this sequence is repeated, the crawler advances through the pipe.

See U.S. Pat. Nos. 4,919,223 issued to Eggers, or 4,581,938 issued to Wentzell as examples of pipe crawlers that move with this inchworm motion. In both of these examples, the leg assemblies have "feet" that extend radially outward to engage the inner wall of the pipe. The feet of these carriers are driven by smaller air cylinders. The stroke length of the cylinders need only be long enough to allow the feet to disengage and engage the pipe wall. However, having a longer stroke length enables a pipe crawler to maneuver in pipes having different diameters.

In U.S. Pat. No. 5,018,451 issued May 28, 1991, filed by the same assignee as the present invention, there is described a pipe crawler moving with the inchworm motion and having two additional air cylinders on each leg assembly for providing additional reach for the four feet of that assembly. The crawler, if sized for a minimum pipe of 12 inches and having a stroke length of two inches for each of the air cylinders that operate the feet, can crawl in a pipe having a maximum inner diameter of 16 inches. With the two additional air cylinders to extend the range of the feet, another four inches of pipe diameter are possible for a maximum diameter of 20 inches.

However, there remains a need for a pipe crawler with feet that can extend even farther and preferably without adding undue complexity in design or operation.

SUMMARY OF THE INVENTION

According to its major aspects and broadly stated, the present invention is a pipe crawler that moves in the inchworm mode and has the capability of crawling in pipes where the diameter in some sections of the pipe is approximately triple that of other sections. The pipe crawler comprises two leg assemblies, a front leg assembly and a rear leg assembly, connected to each other by one or more body air cylinders or other actuators that enable the axial spacing between the front and the rear leg assemblies to be changed, specifically, to be increased and decreased.

Each leg assembly comprises a frame with a plurality of feet, preferably four feet, each of which is moved radially between an extended, pipe wall-engaging position and a retracted position by an air cylinder, or, again, by some other type of actuator. The air cylinders of each leg assembly are arranged so that not more than two, but preferably two, are laying in the same axial plane. If two are in the same plane, they are placed parallel to each other so that their directions of operation oppose each other. Because of this arrangement, the air cylinders can have a stroke length equal to the width of the pipe crawler and therefore will have a stroke length that can approximately triple the reach of the crawler in its most retracted state.

The pipe crawler has (1) a valve system, (2) a manifold for distributing air from a single air hose pulled by the pipe crawler, through the valve system, to each of the air cylinders, and (3) a controller to sequence the valves, thereby eliminating the need for pulling separate air hoses for each air cylinder or each leg assembly through the pipe. Carrying the valve system and manifold on the crawler is an important feature of the invention in that, for crawling greater distances through a pipe, the weight of the umbilical cord—the air hoses and cabling needed to support the pipe crawler—quickly becomes the dominant factor in the weight being supported by the crawler's legs. By eliminating five of six air hoses, significant weight is saved.

In the event of a system failure, the controller retracts all eight legs of the front and rear leg assemblies so that the pipe crawler does not get stuck in the pipe. The frames of the front and rear leg assemblies are also fitted with casters to make moving the retracted crawler easier and less abrasive to the pipe wall since the castors allow the crawler to roll when the legs are fully retracted, however, any rolling device, such as a wheel, would work equally well.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 2 is a rear, perspective view of the pipe crawler shown in FIG. 1;

DETAILED DESCRIPTION OF A PREFERRED EMBODIMENT

Figure 1:
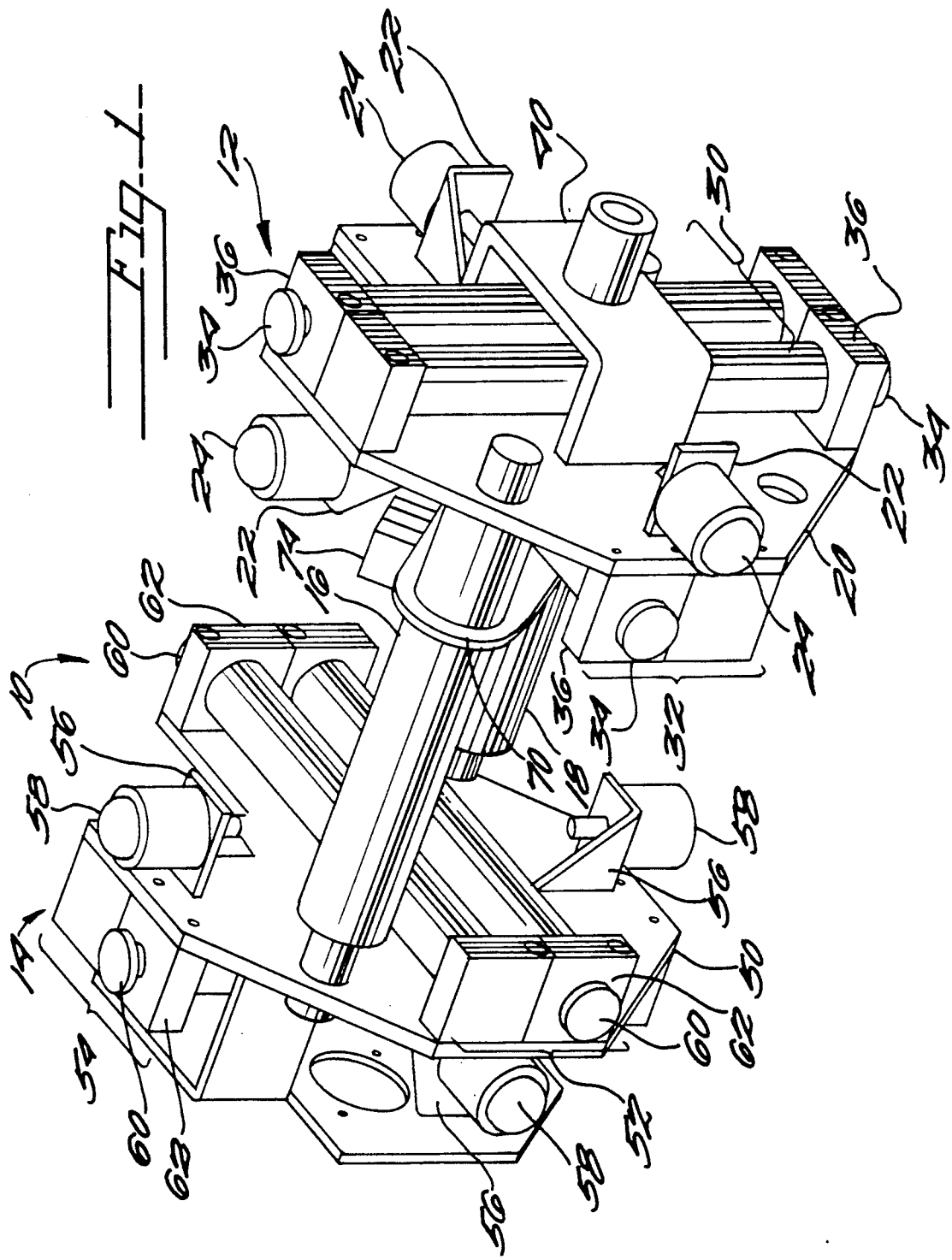
FIG. 1 is a front, perspective view of a pipe crawler according the a preferred embodiment of the present invention.

Referring now to FIGS. 1 and 2, there is illustrated in perspective a pipe crawler, generally indicated by the reference numeral 10, according to the present invention. FIG. 1 shows the crawler from the front and FIG. 2 shows the same crawler from the back.

Pipe crawler 10 has a front leg assembly 12 and a rear leg assembly 14. Joining front and rear leg assemblies 12 and 14 are a pair of actuators 16 and 18. Actuators 16 and 18 are preferably air cylinders but can be hydraulic cylinders or electromechanical cylinders or any type of actuator which has a shaft that can be extended or retracted on command. By extension and retraction of actuators 16 and 18, the axial spacing of front and rear leg assemblies 12 and 14 is increased and decreased, respectively. The long dimensions of actuators 16, 18 are parallel to and define the axis of pipe crawler 10, which is generally coincident with the axis of a pipe through which crawler 10 would be crawling.

Front leg assembly 12 has a frame comprising a front plate 20 with four brackets 22 for ball transfers or casters 24, that extend radially outward of front plate 20 slightly. Front plate 20 is preferably octagonal or round so that no corners extend radially to the point that they might engage the pipe wall at its smallest diameter. Thus, the smallest diameter of front leg assembly 12 is defined by opposing casters 24.

Four air cylinders (or other type of actuators) are mounted to front plate 20. The air cylinders are preferably mounted in pairs, with a first pair 30 in one plane and a second pair 32 in another plane parallel to the first plane, both planes perpendicular to the axis of the crawler. Preferably, pair 30 is mounted on one side of front plate 20 and pair 32 is mounted on the other side of front plate 20. Pair 30 is perpendicular to pair 32 and each air cylinder of each pair is opposingly directed; that is, a cylinder of each pair drives its shaft in the opposite direction of that which the other cylinder of the pair drives its shaft. Accordingly, the two pair of air cylinders 30 and 32 can extend four shafts radially and in a mutually perpendicular direction.

At the ends of each air cylinder is a foot pad 34 and a foot pad stop 36. Foot pad stops 36 limit the retraction of foot pads 34.

Attached to front plate 20 is a hitch bracket 40 for attaching an instrumentation carriage.

Rear leg assembly 14 is similar to front leg assembly 12. It also has a plate, a rear plate 50, that carries four air cylinders arranged in pairs, a first pair 52 of air cylinders and a second pair 54 of air cylinders, first pair 52 being perpendicular to second pair 54 and laying in parallel planes on either side of rear plate 50. Four brackets 56 attached to rear plate 50 carry four casters 58.

Likewise, one air cylinder of each pair 52, 54 operates in one direction and the other cylinder of each pair 52, 54 operates in the opposite direction. Both pair of air cylinders 52, 54 have foot pads 60 and foot pad stops 62, as with air cylinder pair 30, 32 of front leg assembly 12. In both front leg assembly 12 and rear leg assembly 14, casters 24 and 58 are positioned to be aligned azimuthally with the center of the pairs of cylinders.

It will be clear that the number of air cylinders is somewhat arbitrary but that at least two air cylinders are required to hold a pipe crawler 10 without undue effort or slippage. Furthermore, the arrangement of the cylinders may be different and still satisfy the overall requirement and feature of this invention that at most two cylinders can be in the same axial plane, a plane perpendicular to the axis of air cylinder 10. If three air cylinders are used, three planes, all axially parallel are required. If four air cylinders are used, each of the four could be in a different axial plane. However, by placing two air cylinders in parallel, two can lie in the same plane without interfering with each other. If five air cylinders are used, five separate axial planes are required. If six air cylinders are used, six planes could be used or, again arranging the air cylinders in pairs, three sets of two cylinders in three planes would provide the same, near-tripling of the radial range.

Figure 3A:
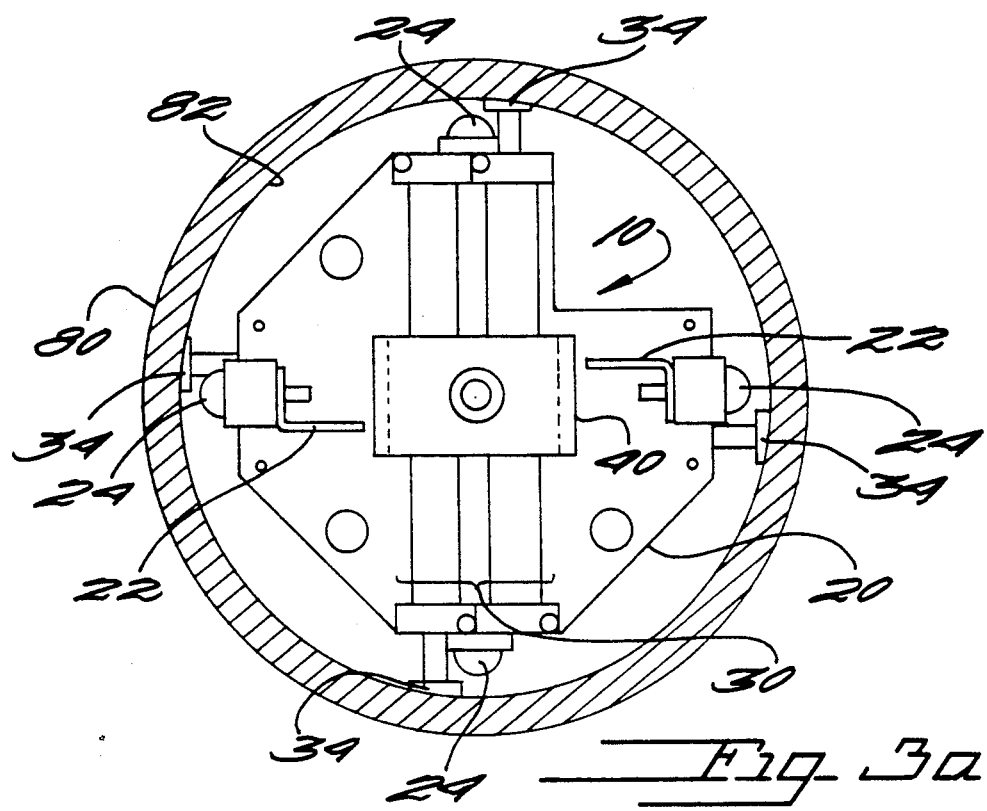
FIG. 3a is a front end view of the pipe crawler of FIG. 1 showing the feet in their extended, wall-engaging positions.
Figure 3B:
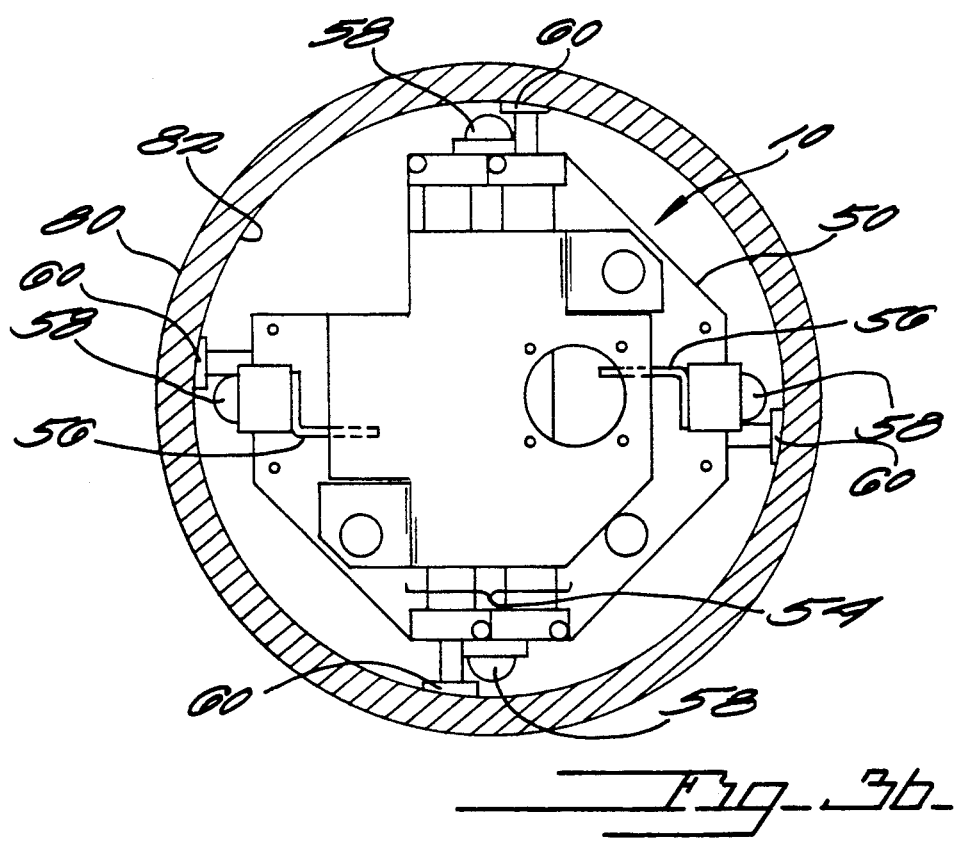
FIG. 3b is a front end view of the pipe crawler of FIG. 1 showing the feet in their extended, wall-engaging positions.

Referring to FIGS. 3a and 3b, there is illustrated pipe crawler 10 from the front and rear in a section of pipe 80 having a small diameter. Foot pads 34 (FIG. 3a) and 60 (FIG. 3b) engage the interior surface 82 of pipe 80. Foot pads 34, 60 are extended radially only a small distance beyond casters 24 (FIG. 3a) and 58 (FIG. 3b). Note that front and rear plates 20 (FIG. 3a) and 50 (FIG. 3b), because of their octagonal shapes do not engage interior surface 82. Also, as noted above, casters 24, 58 are centered on the cylinder pairs.

Figure 4A:
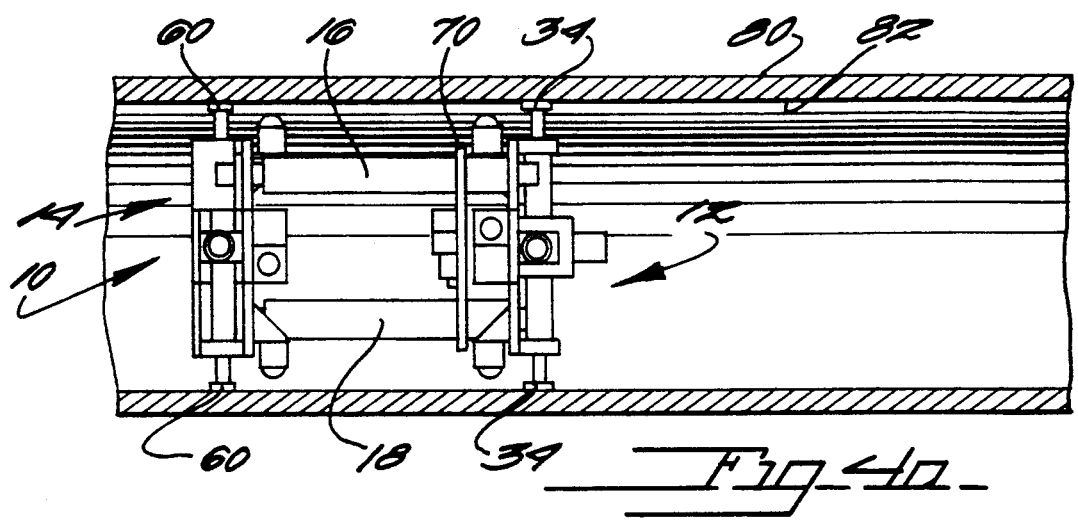
FIGS. 4a, 4b, and 4c show a pipe with a pipe crawlers in various phases of the inchworm mode of movement.
Figure 4B:
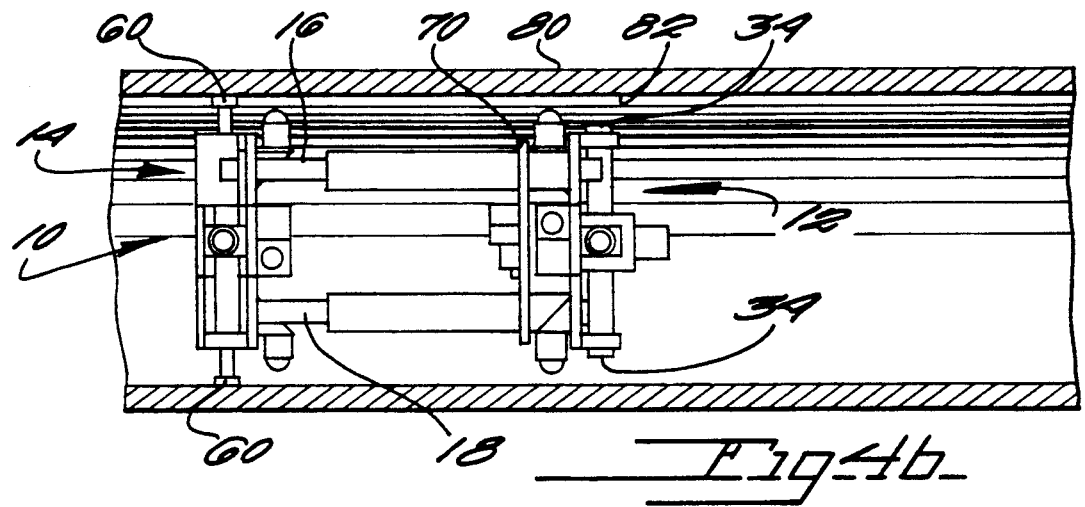
Figure 4C:
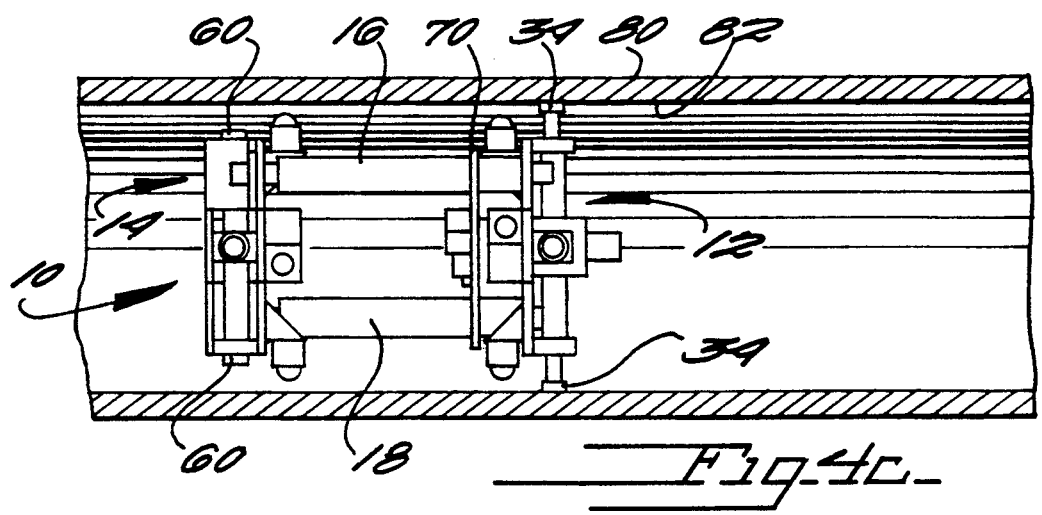

FIGS. 4a, 4b, and 4c illustrate the inchworm movement of pipe crawler 10. In FIG. 4a, foot pads 34, 60 of front and rear leg assemblies 12, 14, respectively are extended to hold crawler 10 in position. First and second actuators 16, 18 are retracted. In FIG. 3b, however, foot pads 34 of front leg assembly 12 are fully retracted and first and second actuators 16, 18 are fully extended so that pipe crawler 10 is reaching axially along pipe 80, supported by rear foot pads 60 engaging interior surface 82.

In FIG. 4c, foot pads 34 of front leg assembly 12 are extended to engage interior surface 82 of pipe 80 and rear leg assembly 14 has been brought proximate to front leg assembly 12 by the retraction of first and second actuators 16, 18. If the diameter of pipe 80 increases, the extension of foot pads 34, 60 will increase to engage the interior surface of the pipe until the pipe diameter is approximately three times the diameter of pipe crawler 10.

Positioned between and separating front and rear leg assemblies 12, 14, actuators 16 and 18 carry a mounting plate 70 attached thereto. To mounting plate 70 is attached a manifold 72 and a set of valves 74. Manifold 72 receives air or other activation fluid in the event the legs are driven by hydraulic cylinders from the umbilical cord connected to an air supply (not shown) and distributes it to each of the air cylinders. Valves 74 are preferably solenoid valves and sequence the actuation of the air cylinders.

Figure 5:
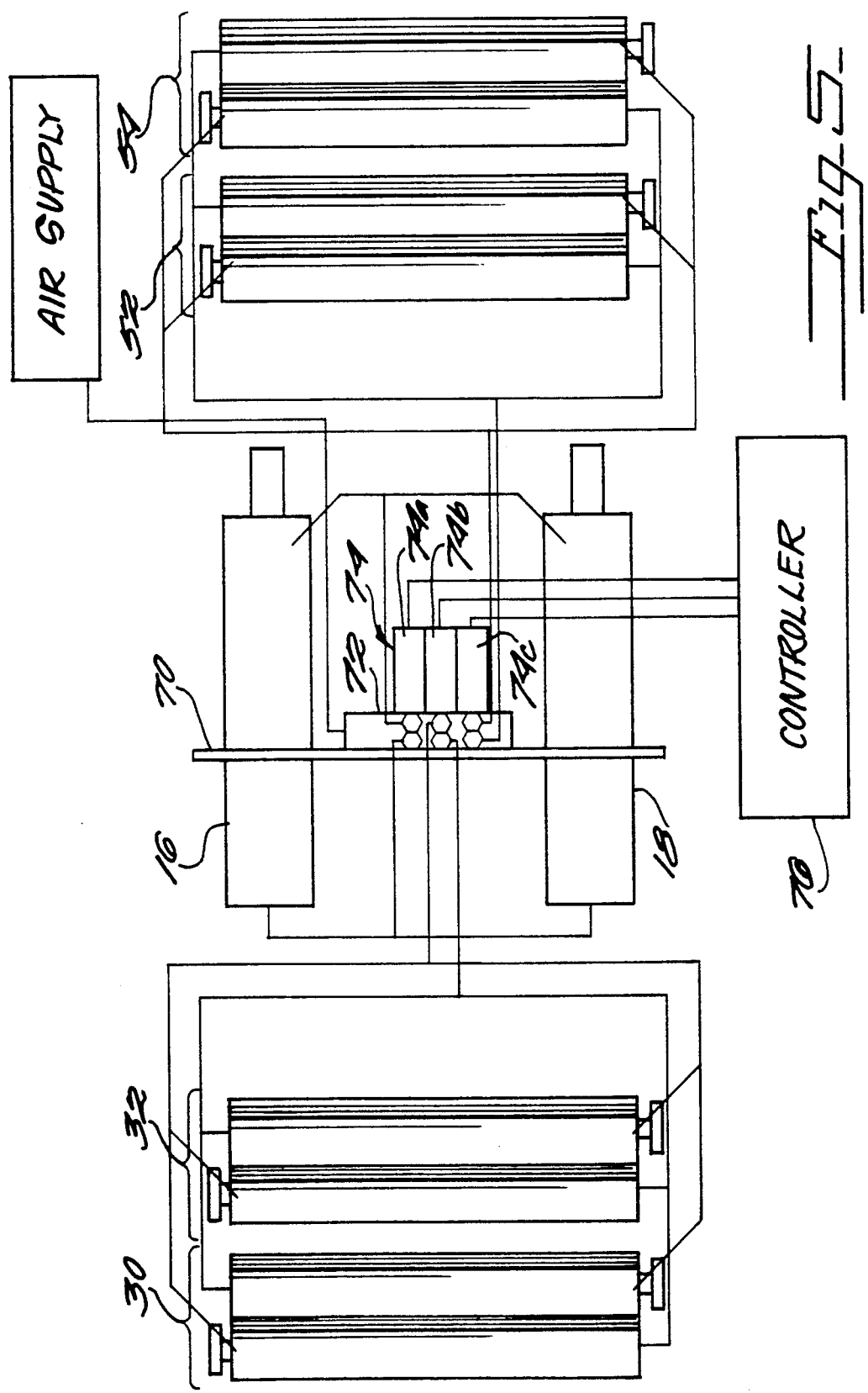
FIG. 5 is a schematic diagram of the air cylinder tubing for distributing the air to the various air cylinders of a pipe crawler according to the present invention.

In the present pipe crawler 10, there are ten air cylinders. The ten air cylinders operate in three groups: (A) first and second pair (30, 32) of front leg assembly (12); (B) first and second pair (52, 54) of rear leg assembly (14); and (C) first and second actuators (16, 18). As illustrated in FIG. 5, each group is operated by one valve of valves 74. Each valve can extend and retract one set of air cylinders. Valve 74a controls first and second actuators 16, 18 through manifold 72; valve 74b controls first and second pair of air cylinders 30, 32 of front leg assembly 12; and valve 74c controls first and second air cylinders 52, 54 of rear leg assembly 14. Valves 74 are connected to a controller 76 via electrical wires, preferably flexible, lightweight, strong, and well-insulated. Controller 76 controls the sequence of the valves so that crawler 10 moves at the speed and direction intended.

Using the three groups identified above, A, B, and C, and the terminology "A" meaning extend first and second pair 30, 32, and "not A" meaning retract first and second pair 30, 32, the crawling forward sequence would be: B, not A, C, A, not B, not C, B, not A, C, and so on. The retreating sequence would be: A, not B, C, B, not A, not C, A, not B, and so on.

Pipe crawler 10 is preferably made of a strong but lightweight material such as aluminum, aluminum alloy or a ceramic composite. The air hoses are preferably made of polyethylene or polyurethane tubing. Suitable valve set 74 and manifold are manufactured by Humphrey, model numbers M401-12VDC and MOC4, respectively. Air cylinders of an appropriate type are made by BIMBA, model numbers FS-09-7.5 for the eight leg cylinders and 124-DP for the actuators 16, 18.

It will be apparent to those skilled in the art that many changes and substitutions can be made to the preferred embodiment herein described without departing from the spirit and scope of the present invention which is defined by the appended claims.

What is claimed is:

1. A pipe crawler, comprising:
   a front leg assembly having
      a first plurality of feet, and
      a first plurality of actuators, each actuator in operative connection with one foot of said first plurality of feet, said foot moving radially upon actuation of said actuator between an extended position and a retracted position, said front leg assembly having not more than two actuators of said first plurality of actuators positioned in the same axial plane of said front leg assembly;
   a rear leg assembly having
      a second plurality of feet, and
      a second plurality of actuators, each actuator in operative connection with one foot of said second plurality of feet, said foot moving radially upon actuation of said actuator between an extended position and a retracted position, said front leg assembly having not more than two actuators of said second plurality of actuators positioned in the same axial plane of said rear leg assembly; and
   means for changing the spacing between said front leg assembly and said rear leg assembly.

2. The pipe crawler as recited in claim 1, wherein said pipe crawler is connected by a hose to a supply of activation fluid and said device further comprises:
   means for distributing said activation fluid to said first and said second plurality of activators, said distributing means carried by said pipe crawler.

3. The pipe crawler as recited in claim 2, wherein said distributing means further comprises:
   a manifold;
   valving means for connecting and disconnecting the flow of actuating fluid to each actuator of said first and said second plurality of actuators, said valving means in fluid communication with said manifold and receiving said actuating fluid from said hose; and
   means for controlling said valving means, said controlling means sequencing said actuators so that said first plurality of said front leg assembly actuators extends or retracts said first plurality of feet simultaneously and said second plurality of said rear leg actuators extends or retracts said second plurality of feet simultaneously.

4. The pipe crawler as recited in claim 1, further comprising means for causing said first and said second plurality of actuators to retract said first and said second plurality of feet, respectively, if said controlling means fails.

5. The pipe crawler as recited in claim 1, further comprising:
   a first plurality of casters carried by said front leg assembly; and
   a second plurality of casters carried by said rear leg assembly.

6. The pipe crawler as recited in claim 1, wherein said first plurality of actuators further comprises four actuators arranged in two pair of opposingly operating actuators, one of said two pair of actuators in a first axial plane of said front leg assembly and a second of said two pair of actuators in a second axial plane of said front leg assembly, and wherein said second plurality of actuators further comprises four actuators arranged in two pair of opposingly operating actuators, one of said two pair of actuators in a first axial plane of said rear leg assembly and a second of said two pair of actuators in a second axial plane of said rear leg assembly.

7. The pipe crawler as recited in claim 6, wherein said pipe crawler has a width and wherein each of said actuators of said first plurality of actuators and of said second plurality of actuators is an air cylinder approximately as long as said pipe crawler is wide.

8. A pipe crawler for moving through the interior wall of a pipe, said pipe crawler connected to a hose supplying air, said pipe crawler having a width, said pipe crawler comprising:
   a front leg assembly having
      a first plurality of feet, and
      a first plurality of air cylinders, said air cylinders having a length approximately equal to said width of said pipe crawler, each air cylinder in operative connection with one foot of said first plurality of feet, said foot moving radially upon actuation of said air cylinder between an extended position and a retracted position;
   a read leg assembly having
      a second plurality of feet, and
      a second plurality air cylinders, said air cylinders having a length approximately equal to said width of said pipe crawler, each air cylinder in operative connection with one foot of said second plurality of feet, said foot moving radially upon actuation of said air cylinder between an extended position and a retracted position;
   means for distributing said air to said first and said second plurality of air cylinders, said distributing means carried by said pipe crawler; and
   means for changing the spacing between said front leg assembly and said rear leg assembly.

9. The pipe crawler as recited in claim 8, wherein said front leg assembly further comprises a front frame and said rear leg assembly further comprises a rear frame, said pipe crawler further comprising:
   a plurality of casters carried by said front frame; and
   a plurality of casters carried by said rear frame.

10. The pipe crawler as recited in claim 8, wherein said distributing means further comprises:
    a manifold;
    valving means for connecting and disconnecting the flow of air to each air cylinder of said first and said second plurality of air cylinders, said valving means in fluid communication with said manifold and receiving said air from said hose; and means for controlling said valving means, said controlling means sequencing said air cylinders so that said first plurality of air cylinders extends or retracts said first plurality of feet simultaneously and said second plurality of air cylinders extends or retracts said second plurality of feet simultaneously.

11. The pipe crawler as recited in claim 8, wherein said first plurality of air cylinders further comprises four air cylinders, not more than two air cylinders of said four air cylinders positioned in the same axial plane of said front leg assembly, and wherein said second plurality of air cylinders further comprises four air cylinders, not more than two air cylinders of said four air cylinders positioned in the same axial plane of said rear leg assembly.

12. The pipe crawler as recited in claim 11, wherein said said four air cylinders of said front leg assembly are arranged in pairs of opposingly operating air cylinders and said four air cylinders of said rear leg assembly are arranged in pairs of opposingly operating air cylinders.

13. The pipe crawler as recited in claim 8, further comprising means for causing said first and said second plurality of air cylinders to retract said first and said second plurality of feet, respectively upon failure of said controlling means.

14. A pipe crawler for moving through the interior wall of a pipe, said pipe crawler connected to a hose supplying air, said pipe crawler comprising:
a front leg assembly having:
    a front frame,
    a plurality of casters carried by said front frame,
    a first plurality of feet, and
    a first plurality of air cylinders carried by said front frame, each air cylinder in operative connection with one foot of said first plurality of feet, said foot moving radially upon actuation of said air cylinder between an extended position and a retracted position, said front leg assembly having not more than two air cylinders of said first plurality of air cylinders positioned in the same axial plane of said front leg assembly;
a rear leg assembly having
    a rear frame,
    a plurality of casters carried by said rear frame,
    a second plurality of feet, and
    a second plurality of air cylinders carried by said rear frame, each air cylinder in operative connection with one foot of said second plurality of feet, said foot moving radially upon actuation of said air cylinder between an extended position and a retracted position, said rear leg assembly having not more than two air cylinders of said first plurality of air cylinders positioned in the same axial plane of said front leg assembly;

means for distributing said air from said hose to said first and said second plurality of air cylinders, said distributing means carried by said pipe crawler; and means for changing the spacing between said front leg assembly and said rear leg assembly.

15. The pipe crawler as recited in claim 14, wherein said distributing means further comprises:
a manifold;
valving means for connecting and disconnecting the flow of air to each air cylinder of said first and said second plurality of air cylinders, said valving means in fluid communication with said manifold and receiving said air from said hose; and means for controlling said valving means, said controlling means sequencing said air cylinders so that said first plurality of air cylinders extends or retracts said first plurality of feet simultaneously and said second plurality of air cylinders extends or retracts said second plurality of feet simultaneously.

16. The pipe crawler as recited in claim 14, wherein said first plurality of air cylinders further comprises four air cylinders, not more than two air cylinders of said four air cylinders positioned in the same axial plane of said front leg assembly, and wherein said second plurality of air cylinders further comprises four air cylinders, not more than two air cylinders of said four air cylinders positioned in the same axial plane of said rear leg assembly.

17. The pipe crawler as recited in claim 16, wherein said four air cylinders of said front leg assembly are arranged in pairs of opposingly operating air cylinders and said four air cylinders of said rear leg assembly are arranged in pairs of opposingly operating air cylinders.

18. The pipe crawler as recited in claim 14, wherein said pipe crawler has a width and said air cylinders have a length approximately equal to said width of said pipe crawler.

19. The pipe crawler as recited in claim 14, further comprising means for causing said first and said second plurality of air cylinders to retract said first and said second plurality of feet, respectively, if said controlling means fails.

* * * * *